(12) United States Patent
Dang et al.

(10) Patent No.: US 11,942,846 B2
(45) Date of Patent: Mar. 26, 2024

(54) APPARATUSES AND METHODS FOR RIGIDLY INTEGRATING PHASE AND NEUTRAL PLATES

(71) Applicant: Rivian IP Holdings, LLC, Plymouth, MI (US)

(72) Inventors: Dang Dang, Garden Grove, CA (US); Logan Balliett, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/233,702

(22) Filed: Apr. 19, 2021

(65) Prior Publication Data
US 2022/0337116 A1    Oct. 20, 2022

(51) Int. Cl.
*H02K 3/50* (2006.01)
*H02K 11/25* (2016.01)
*H02K 15/00* (2006.01)

(52) U.S. Cl.
CPC .............. *H02K 3/50* (2013.01); *H02K 11/25* (2016.01); *H02K 15/0062* (2013.01); *H02K 2203/09* (2013.01)

(58) Field of Classification Search
CPC .... H02K 1/148; H02K 15/0062; H02K 15/10; H02K 3/28; H02K 3/521; H02K 5/22; H02K 3/522
See application file for complete search history.

(56) References Cited

U.S. PATENT DOCUMENTS

| | | | |
|---|---|---|---|
| 7,193,345 B2 * | 3/2007 | Shinzaki | H02K 3/522 310/179 |
| 9,979,249 B2 * | 5/2018 | Fukunaga | H02K 15/0056 |
| 11,146,136 B2 * | 10/2021 | Alsman | H02K 5/225 |
| 2016/0329764 A1 * | 11/2016 | Mizutani | H02K 3/12 |
| 2019/0157934 A1 * | 5/2019 | Kawaguchi | H02K 3/50 |
| 2020/0153307 A1 * | 5/2020 | Abdallah | H02K 3/522 |

* cited by examiner

*Primary Examiner* — Leda T Pham
(74) *Attorney, Agent, or Firm* — BAKERHOSTETLER

(57) ABSTRACT

Various disclosed embodiments include illustrative stator winding interface devices, electric motors, and methods of manufacturing an electric motor. In an illustrative embodiment, a stator winding interface device includes phase plates, a neutral plate, and a structure configured to maintain the phase plates and the neutral plate in a rigid orientation.

20 Claims, 11 Drawing Sheets

APPARATUSES AND METHODS FOR RIGIDLY INTEGRATING PHASE AND NEUTRAL PLATES

INTRODUCTION

The present disclosure relates to attachments on a vehicle for recreational devices. The statements in this section merely provide background information related to the present disclosure and may not constitute prior art.

Electric motor stators include a stator busbar for connecting to an inverter's three-phase alternating current (AC) output. The stator busbar splits each phase for connecting to parallel coil pathways within the stator. Many welds are needed between the stator busbar and the parallel coil pathways. For example, if the stator includes twelve parallel coil pathways, then each phase plates of the stator busbar includes four welds and a neutral plate of the stator busbar includes another twelve welds. Thus, several fixtures are needed for holding the plates in position during welding. Thus, much time and precision are entailed in attaching the stator busbar to the stator.

BRIEF SUMMARY

Various disclosed embodiments include illustrative stator winding interface devices, electric motors, and methods of manufacturing portions of an electric motor.

In an illustrative embodiment, a stator winding interface device includes phase plates, a neutral plate, and a structure configured to maintain the phase plates and the neutral plate in a rigid orientation.

In another illustrative embodiment, an electric motor includes a housing, a stator disposed within the housing, and a rotor. The stator includes stator coil windings and a stator winding interface device couplable to the stator coil windings. The stator winding interface includes phase plates, a neutral plate, and a structure configured to maintain the phase plates and the neutral plate in a rigid orientation. The electric motor also includes a rotor rotatably couplable to the housing and received within a cavity formed by the stator coil windings.

In another illustrative embodiment, a method includes providing phase plates and a neutral plate for a stator windings interface device, placing the phase plates and the neutral plate in a structure configured to maintain the phase plates and the neutral plate in a rigid orientation, and attaching the phase plates and the neutral plate to coil windings of a stator.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
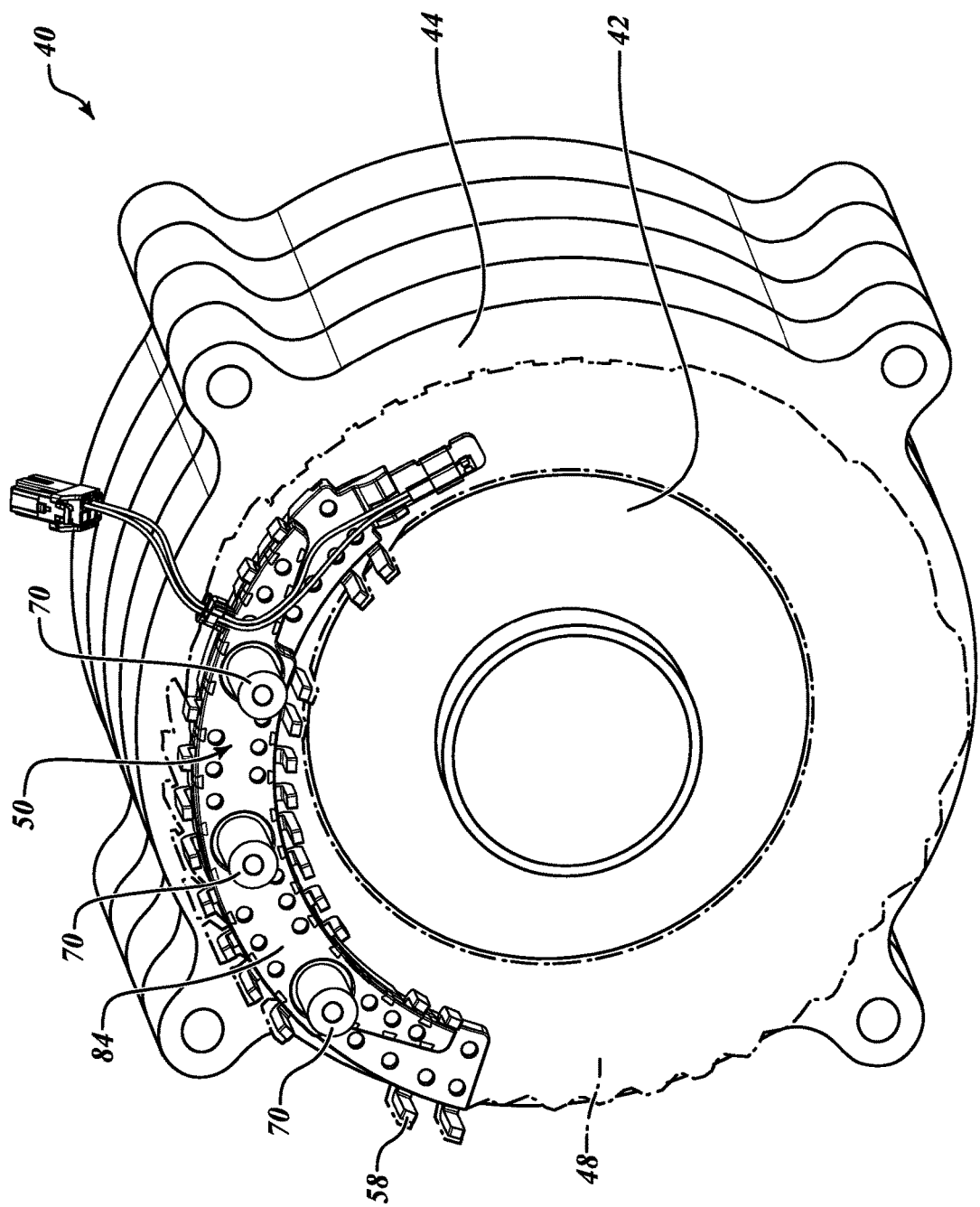
FIG. 1 is a perspective view of an electric motor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative stator winding interface devices, electric motors, and methods for forming an integrated stator busbar.

Referring now to FIG. 1 and given by way of overview, in various embodiments a stator winding interface device 50 includes phase plates 70, a neutral plate 58, and a structure 84 configured to maintain the phase plates 70 and the neutral plate 58 in a rigid orientation. Now that a non-limiting overview has been provided, details will be set forth below by way of non-limiting examples provided by way of illustration only.

Still referring to FIG. 1, in various embodiments a three-phase electric motor 40 includes a stator 44, a rotor 42, and the stator winding interface device 50 (also referred to as a stator busbar). The rotor 42 is rotatably received within the stator 44. The stator busbar 50 is bonded to coils 48 of the stator 44.

In various embodiments, the stator busbar 50 includes three phase plates 70 and the neutral plate 58 that are electrically and physically isolated from each other by the structure 84. In various embodiments the structure 84 may be a rigid structure. In such embodiments, the rigid structure 84 may be made from any material that provides sufficient electrical insulation and a rigidity acceptable for maintaining alignment between the phase plates 70 and the neutral plate 58. The materials may include engineering plastics or thermoplastics that can withstand wide temperature ranges, such as acrylonitrile butadiene styrene (ABS), polycarbonates, or comparable materials. The rigid structure 84 may be formed by placing the phase plates 70 and the neutral plate 58 into a mold and overmolding a material, such as a thermoplastic material, over the phase plates 70 and the neutral plate 58, as is discussed in more detail below. Also, the rigid structure 84 may be created from multiple molds, thereby creating multiple overmolds of a thermoplastic material that bond to each other, as is also discussed in more detail below.

Figure 2:
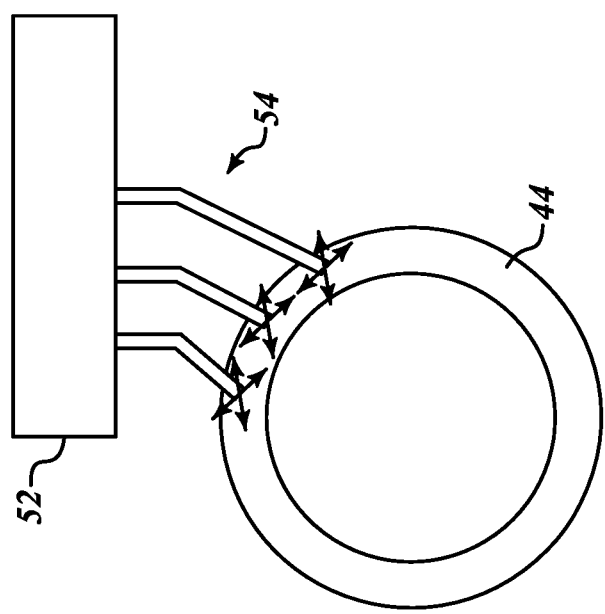
FIG. 2 is a block diagram of an electric motor system.

Referring additionally to FIG. 2, in various embodiments the stator 44 is connected via the stator busbar 50 to three phase electrical leads 54. The three phase electrical leads 54 connect at another end to an inverter 52. The three-phase electric motor 40 and the connected inverter 52 form part of a drive unit.

Figure 3:
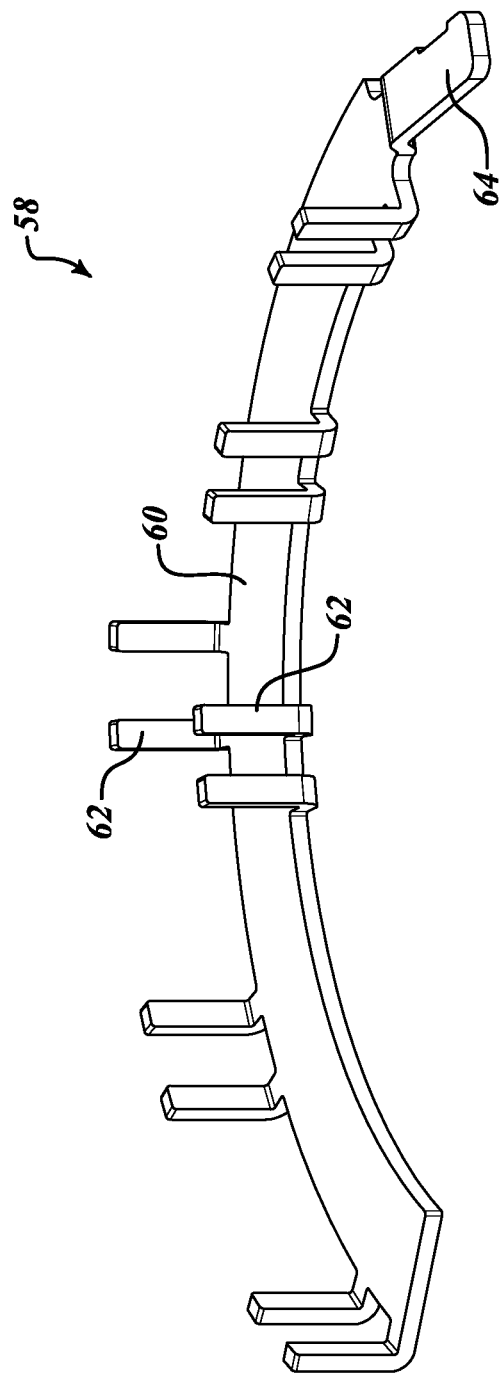
FIG. 3 is a perspective view of a neutral plate for the electric motor of FIG. 1.

Referring additionally to FIG. 3, in various embodiments the stator busbar 50 includes a neutral plate 58. The neutral plate 58 suitably is formed from a stamped sheet of copper or comparable conductive material. The neutral plate 58 includes a base section 60 having an arc shape or other suitable shape for matching the curve of an end of the stator 44. The neutral plate 58 includes weld tabs 62. In various embodiments and given by way of example only and not of limitation, the stator 44 includes twelve parallel coil pathways. Thus, in such embodiments the neutral plate 58 includes six weld tabs 62 that extend from a concave side of the base section 60 and six weld tabs 62 that extend from a convex side of the base section 60. The weld tabs 62 are bent to be approximately parallel to a normal vector of the base section 60. The neutral plate 58 also includes a sensor tab 64 that extends from one end of the base section 60. However, it will be appreciated that any number of coil pathways and weld tabs may be used as desired for a particular application.

Figure 4:
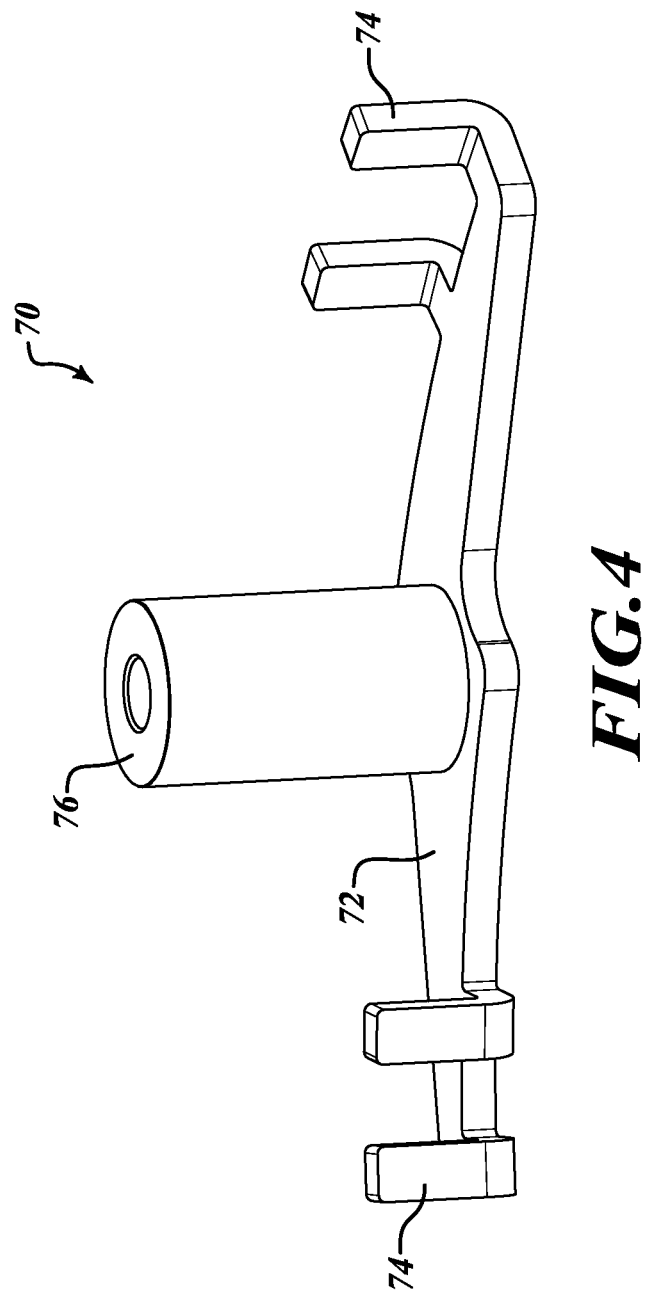
FIG. 4 is a perspective view of a phase plate for the electric motor of FIG. 1.

Referring additionally to FIG. 4, in various embodiments the stator busbar 50 includes three phase plates 70. The phase plates 70 are stamped from a sheet of copper or comparable conductive material to include a base section 72 and four weld tabs 74. The weld tabs 74 are bent to be approximately parallel to a normal vector of the base section 72. The weld tabs 74 provide connection to four parallel pathway coils of the stator 44. An internally threaded rod 76 (also referred to as a bolt mount) is mounted to the base section 72. The internally threaded rod 76 may be laser welded to, pressure fitted into, or attached in a secure manner to the base section 72. The internally threaded rod 76, as will be shown later in reference to FIG. 10, connects to inverter leads. It will be appreciated that the internally threaded rod 76 may include other mechanisms for connecting to the inverter leads, for example an externally threaded post.

It will be appreciated that the stator 44 may include a different number of parallel pathways depending upon the type and design of the three-phase electric motor 40, thus affecting the number of welds entailed for each plate.

Figure 5:
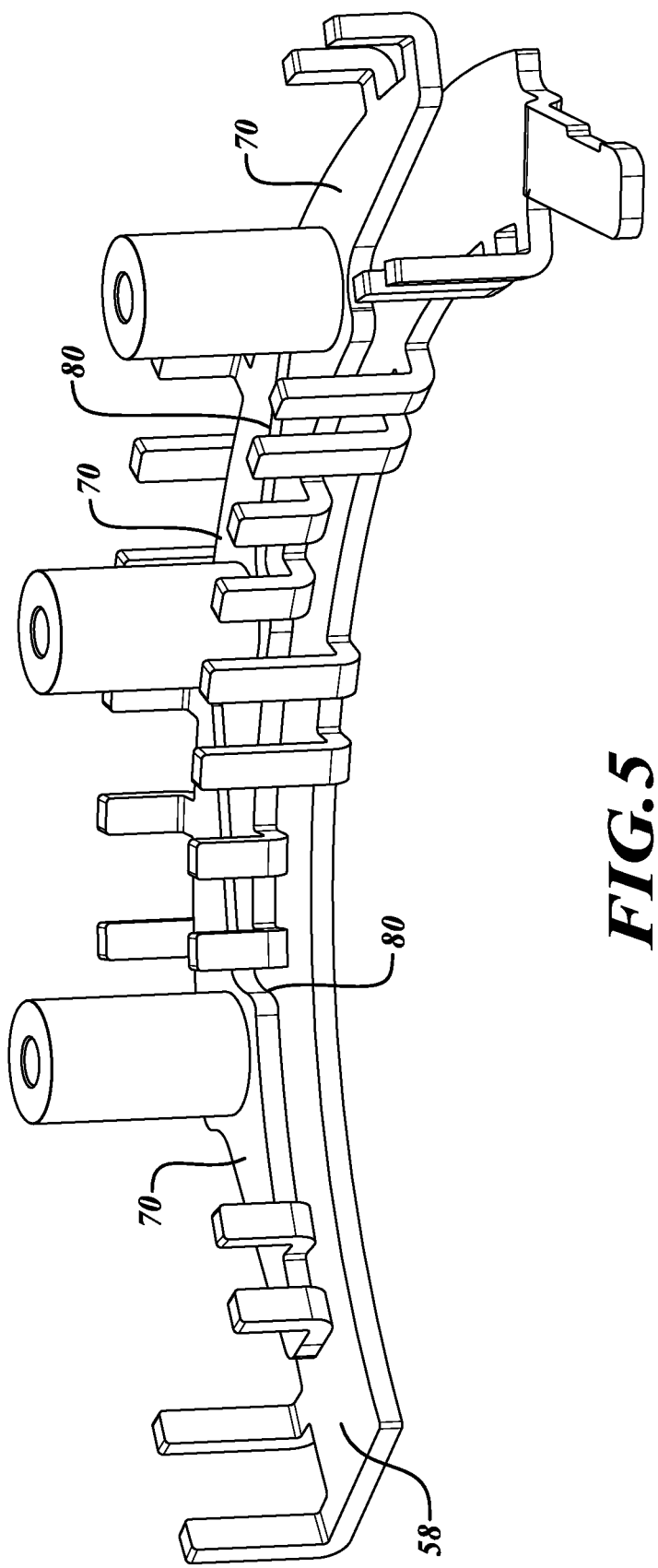
FIG. 5 is a perspective view of the phase plates and the neutral plate for the electric motor of FIG. 1.

Referring additionally to FIG. 5, in various embodiments the three phase plates 70 and the neutral plate 58 are positioned as they would be in an injection mold tooling device prior to bonding the parts with a material, such as a heated thermoplastic cooled within a mold to create a molded structure. The three phase plates 70 are positioned to have first and second dielectric gaps 80 between the base sections 72 of the three phase plates 70. The geometry of the edges of the three phase plates 70 at the dielectric gap 80 and the width of the dielectric gap 80 are selected to provide a maximized gap between the three phase plates 70 while minimizing current density. The injected material will occupy the dielectric gap 80 for preventing shorts. Also, a third gap exists between the neutral plate 58 and the three phase plates 70 to allow for injected material to occupy the third gap and provide insulation between the three phase plates 70 and the neutral plate 58.

Figure 6:
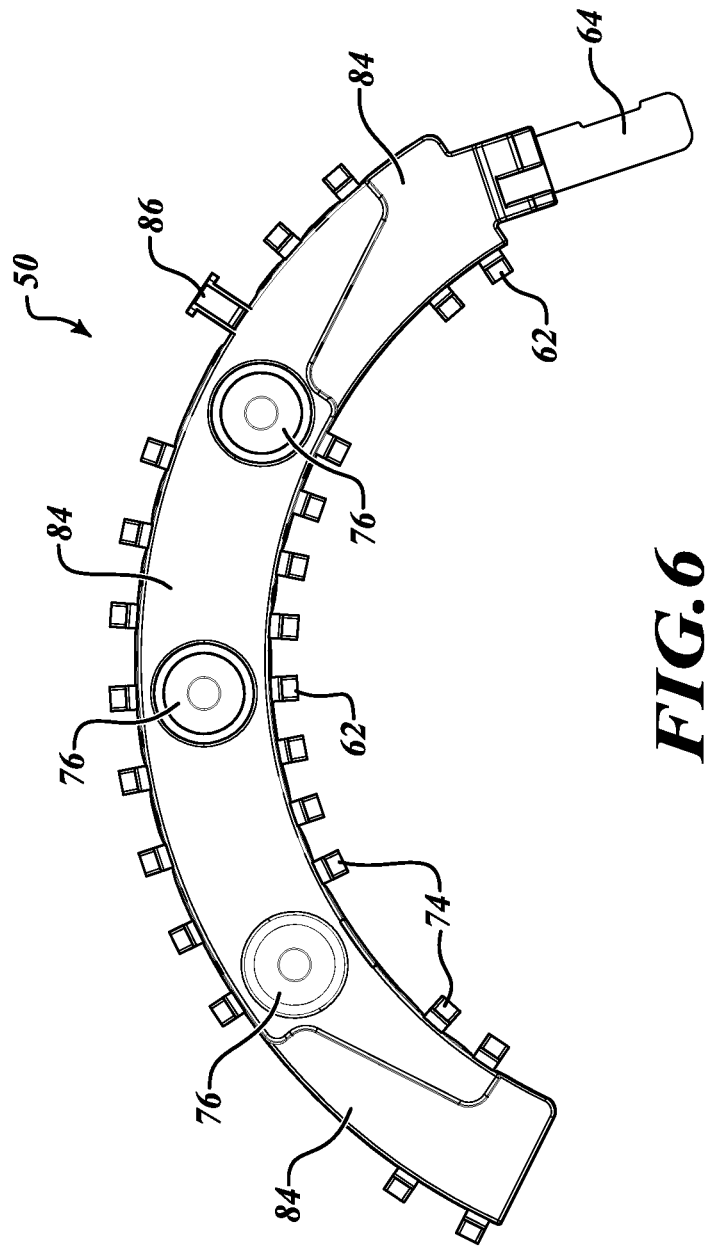
FIG. 6 is a top view of a completed busbar for the electric motor of FIG. 1.

Referring additionally to FIG. 6, in various embodiments an injection molding process of the stator busbar 50 has been completed. The injection molding process produces an injection mold structure 84 that rigidly maintains the orientation of the three phase plates 70 and the neutral plate 58 according to the injection mold setup shown in FIG. 5. The injection mold structure 84 covers the base section 60 of the neutral plate 58 and the base section 72 of the three phase plates 70. The weld tabs 62 and 74, the sensor tabs 64, and the internally threaded rods 76 are exposed outside of the injection mold structure 84. The injection mold tooling structure 84 also includes a molded sensor wire mount 86 that extends from an outer surface of the injection mold structure 84.

Figure 7:
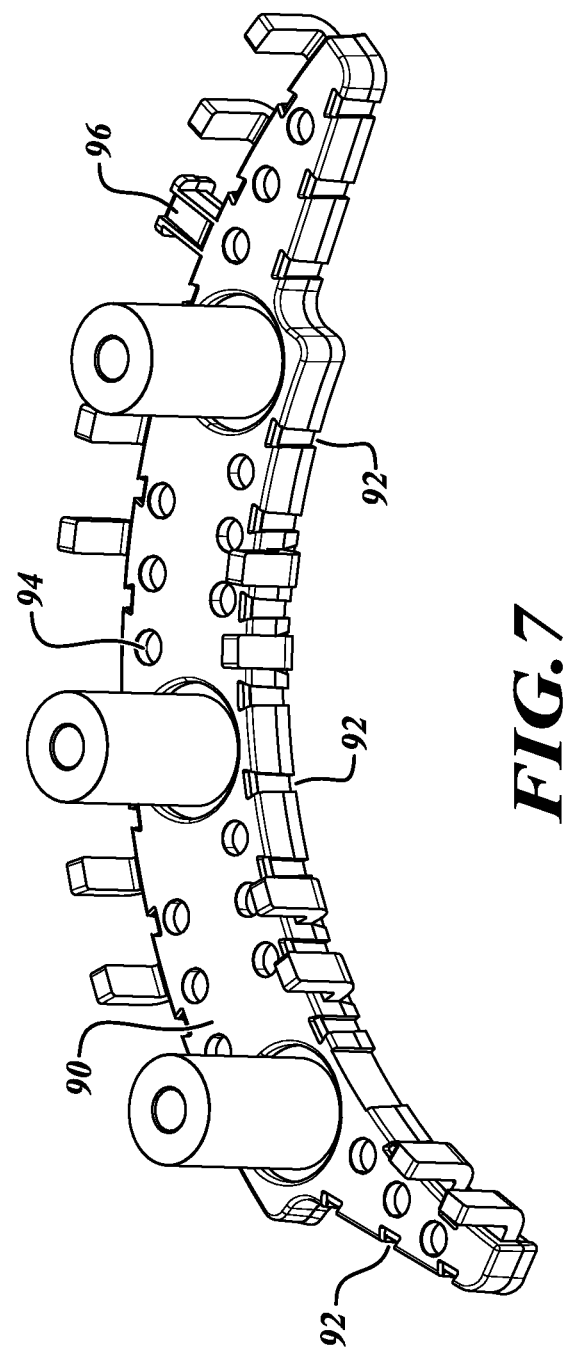
FIG. 7 is a perspective view of a phase plates structure for the electric motor of FIG. 1.

Referring additionally to FIG. 7, in various embodiments the three phase plates 70 are bonded within a first structure 90, thus keeping the three phase plates 70 in the orientation shown new in FIG. 5. The first structure 90 includes pin setting holes 94 form from tooling pins of a first injection mold tooling structure used to keep the three phase plates 70 oriented while the first structure 90, in liquid form, is applied. The first structure 90 also includes vertical locking slots 92 (or first lock features) located around an outer surface of the first structure 90. The first structure 90 also includes a molded sensor wire mount 96 that extends from an outer surface of the first structure 90.

Figure 8:
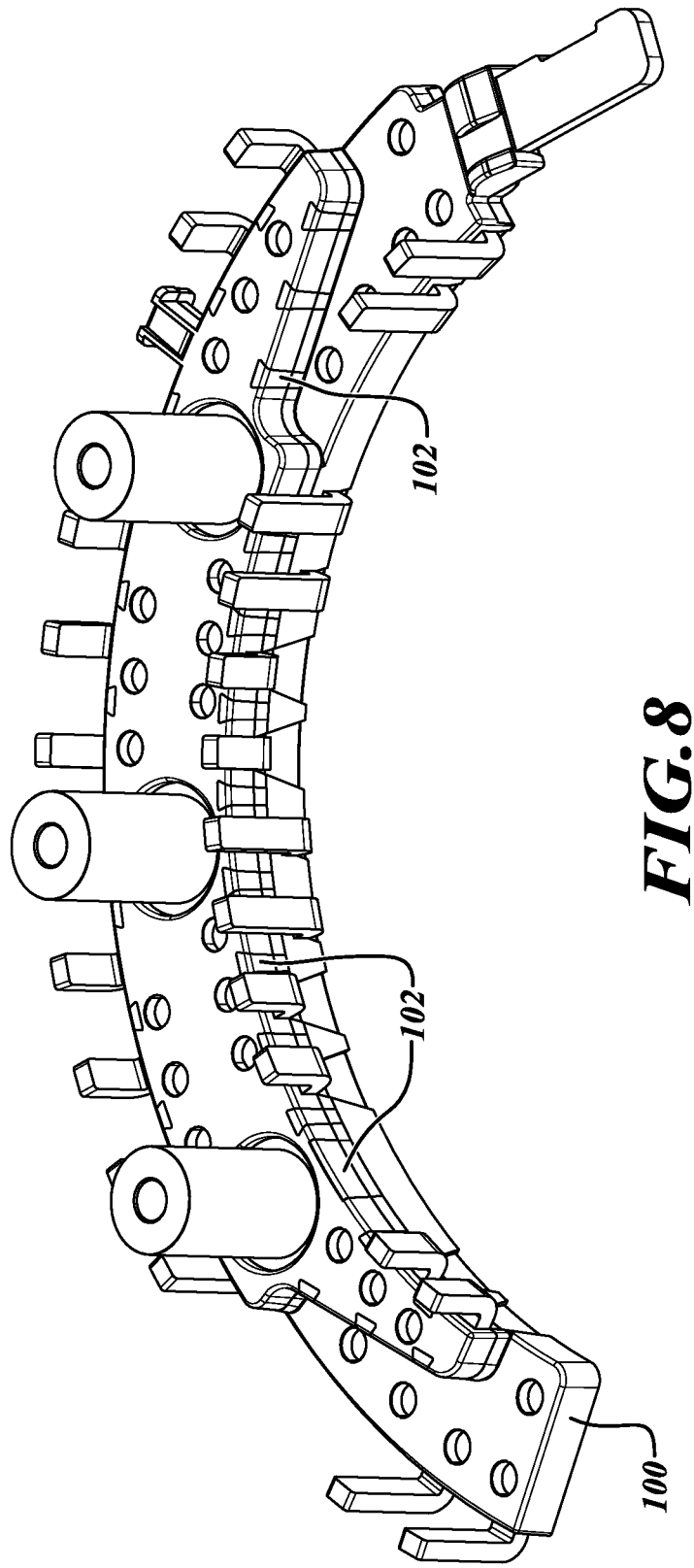
FIG. 8 is a perspective view of a completed busbar for the electric motor of FIG. 1.

Referring additionally to FIG. 8, in various embodiments the first structure 90 with the three phase plates 70 is inserted into a second injection mold tooling structure with the neutral plate 58 in an orientation similar to that shown in FIG. 5. Then, a second structure 100, in liquid form, is inserted into the second injection mold tooling structure while tooling pins hold the neutral plate 58 in place relative to the first structure 90. The second structure 100 includes vertical locking tabs 102 (or second lock features) that correspond in position and size to the vertical locking slots 92 of the first structure 90. The vertical locking tabs 102 received within the vertical locking slots 92 provide a mechanical link/lock between the first structure 90 and the second structure 100. Additionally, chemical bonding also occurs between a bottom surface of the first structure 90 and a top surface of the second structure 100 when the second structure 100 is applied. Also, the second structure 100 includes holes formed due to tooling pins.

Figure 9:
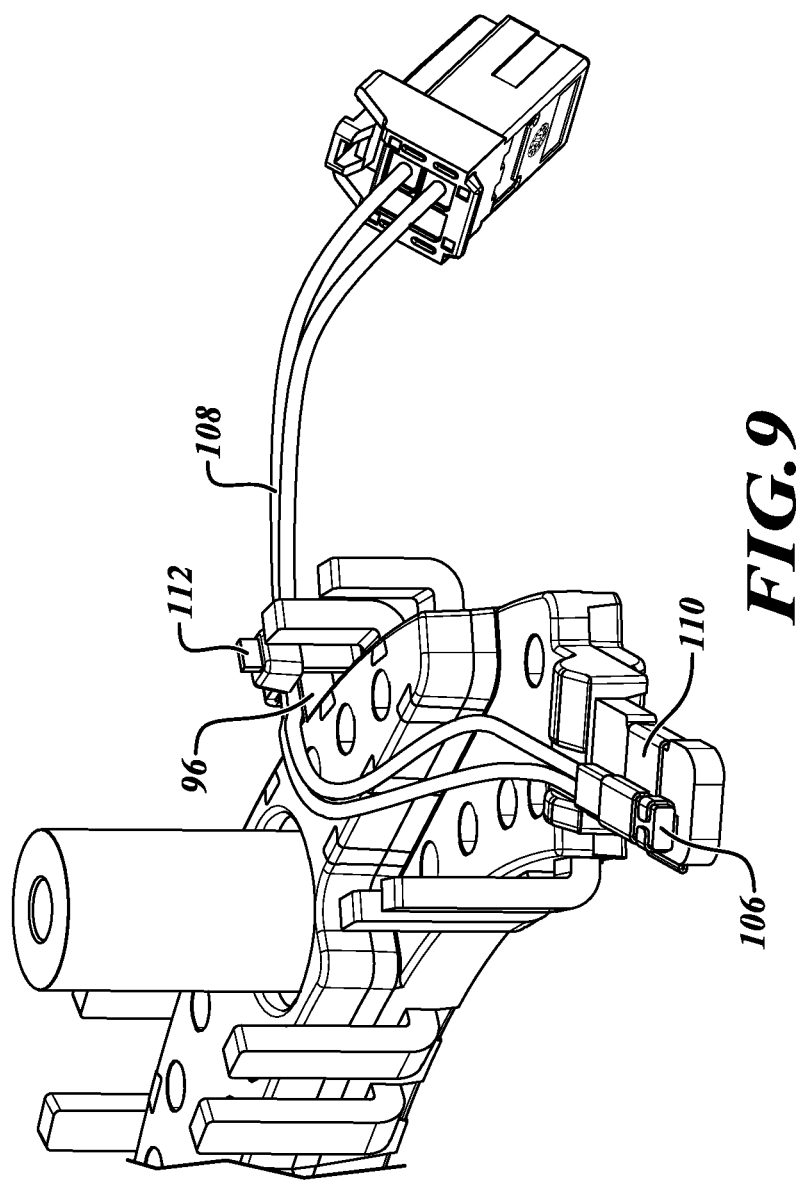
FIG. 9 is a perspective view of a portion of the busbar of FIG. 8.

Referring additionally to FIG. 9, in various embodiments the wire mount is configured to support sensor wiring 108 associated with a sensor 106. In some embodiments, the sensor 106 is attached to the sensor tab 64 via an attachment device 110 such as, without limitation, a clip, a thermal adhesive, or a comparable attachment device. Sensor wiring 108 is attached to the wire mount 86 via an attachment device 112 such as, without limitation, a clip, a zip tie, or comparable device. In various embodiments, the sensor 106 may include a temperature sensor. In various embodiments, the tab 64 may be further configured to transmit heat to the sensor 106.

Figure 10:
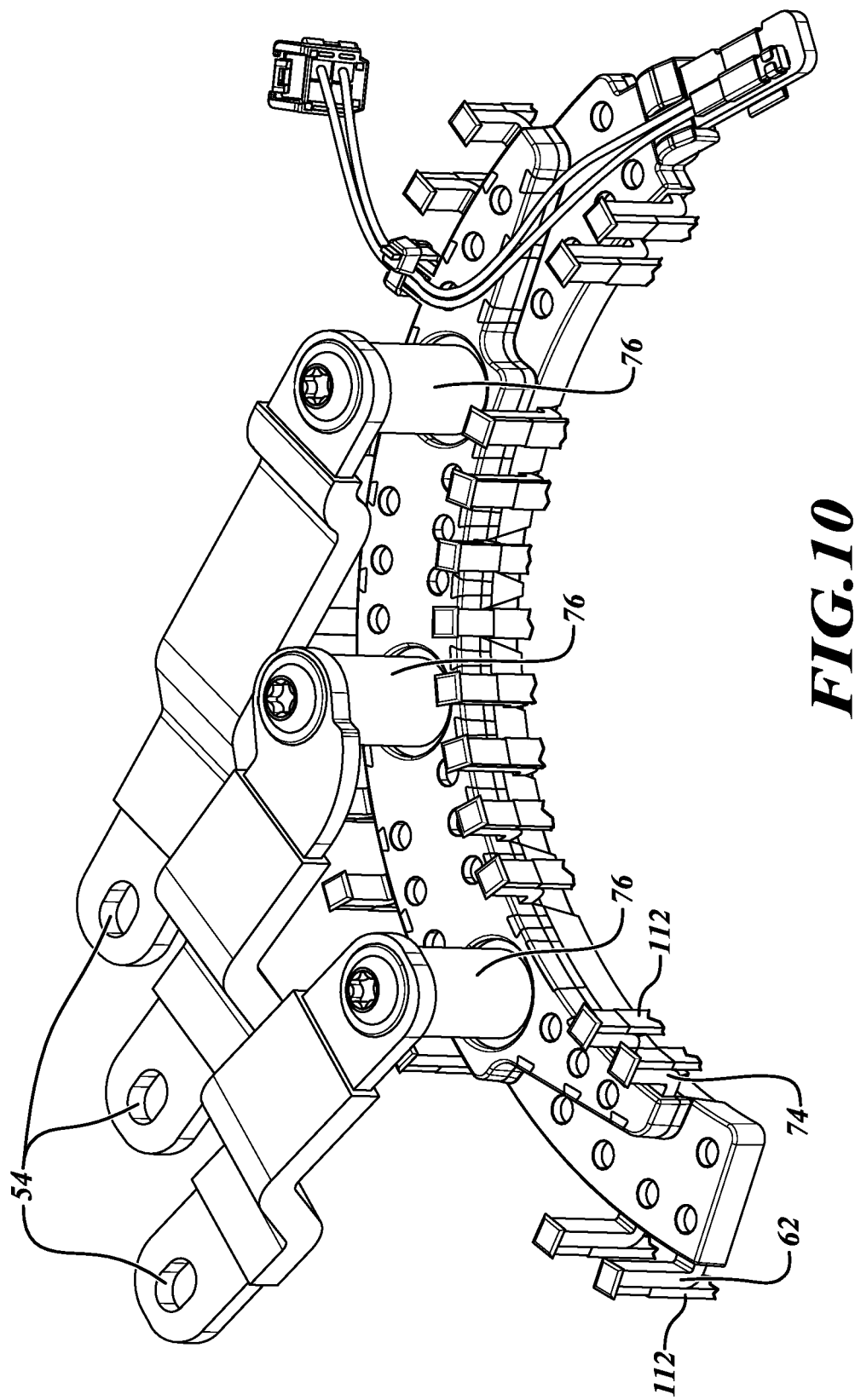
FIG. 10 is a perspective view of the busbar of FIG. 8 in a partially connected configuration.

Referring additionally to FIG. 10, in various embodiments each of the threaded rods 76 is configured to connect to an inverter lead 54. Given by way of non-limiting example, in various embodiments the electrical leads 54 are attached, such as by being bolted or the like, to the internally threaded rods 76 at one end and then attached to the inverter at another end. Before the electrical leads 54 are attached to the internally threaded rod 76, the weld tabs 62 and 74 are welded to corresponding stator coil ends 112.

In various embodiments, the rigid structure 84 (FIG. 5) may be formed of multiple parts created from multiple molds. A first mold creates a bottom structure configured to hold the neutral plate 58 in a first orientation. A second mold creates a top structure configured to hold the three phase plates 70 in a second orientation. A third mold creates a middle structure configured to attach to the bottom and top structure to hold the three phase plates 70 and the neutral plate 58 in a third orientation. The orientation of the phase plates 70 and the neutral plate 58 is illustrated in FIG. 5. The top, bottom, and middle structures include attachment features that allow the middle structure to attach to the top and bottom structures. This is considered a molding process not an overmolding process like that described below.

Figure 11:
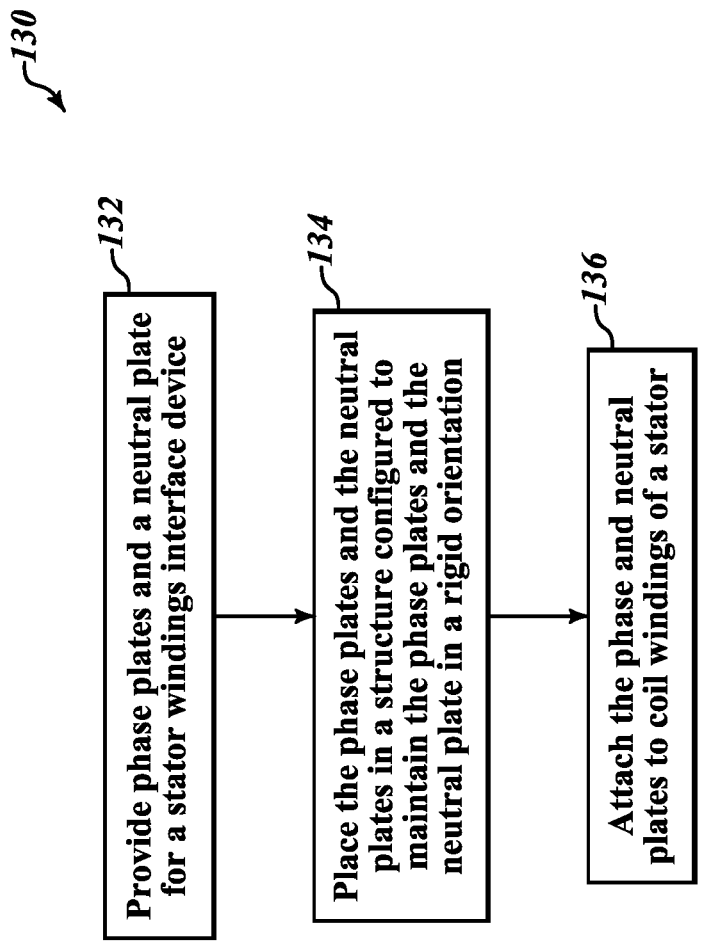
FIG. 11 is a flow chart diagram of an illustrative process for manufacturing the motor of FIG. 1.

In various embodiments and referring additionally to FIG. 11, an illustrative process 100 may be performed for creating and attaching a stator busbar to a stator. At a block 132, phase plates and a neutral plate are provided for a stator windings interface device. At a block 134, the phase plates and the neutral plate are placed in a structure configured to maintain the phase plates and the neutral plate in a rigid orientation. At a block 136, the phase plates and the neutral plate are attached to coil windings of a stator.

In various embodiments the phase plates and the neutral plate may be provided, without limitation, by stamping from a metal plate, bending, welding, machining, or forming in a comparable manner.

In some embodiments, the phase plates and the neutral plate may be placed in the structure at the block 134 by forming the structure around a portion of the phase plates and a portion of the neutral plate in a mold tooling device. For example, in some such embodiments the structure may be formed around a portion of the phase plates and a portion of the neutral plate in a mold tooling device. This may be done by a molding process described above or any other suitable process as desired.

In some other embodiments, the phase plates and the neutral plate may be placed in the structure at the block 134 by forming a first structure around a portion of the phase plates, forming a second structure around a portion of the neutral plate, and attaching the first structure to the second structure. In some such embodiments the first structure may be attached to the second structure by chemically bonding and/or mechanically bonding the first structure to the second structure as desired for a particular application.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A stator winding interface device for use with a stator defining an axial direction, an orthogonal circumferential direction, and a radial direction orthogonal to both the axial and circumferential directions, the stator winding interface device comprising:
   a plurality of phase plates each comprising a base section;
   a neutral plate comprising a base section; and
   a structure configured to maintain the plurality of phase plates and the neutral plate in a rigid orientation;
   wherein the base sections of all of the plurality of phase plates are disposed concentrically about the stator in a same plane defined along the orthogonal circumferential and radial directions that is disposed adjacent and parallel to a different plane of the base section of the neutral plate, the different plane offset in the axial direction from the same plane.

2. The device of claim 1, wherein the structure includes a molded thermoplastic structure.

3. The device of claim 1, wherein:
the structure includes a wire mount configured to support wiring associated with a sensor; and
the neutral plate includes a tab configured to receive the sensor.

4. The device of claim 3, wherein the tab is further configured to transmit heat to the sensor.

5. The device of claim 1, wherein each of the plurality of phase plates includes a bolt mount including an internally threaded rod configured to connect to an inverter lead.

6. The device of claim 2, wherein the structure includes:
a first structure configured to rigidly maintain the plurality of phase plates in a fixed orientation; and
a second structure configured to rigidly maintain the neutral plate in a fixed orientation to the first structure.

7. The device of claim 6, wherein a portion of a bottom surface of the first structure is chemically bonded to a top surface of the second structure.

8. The device of claim 6, wherein the first structure includes a plurality of first lock features and the second structure includes the plurality of second lock features, the plurality of second lock features being configured to mechanically lock with the plurality of first lock features.

9. An electric motor comprising:
a housing;
a stator disposed within the housing and defining an axial direction, an orthogonal circumferential direction, and a radial direction orthogonal to both the axial and circumferential directions, the stator including:
stator coil windings; and
a stator winding interface device couplable to the stator coil windings, the stator winding interface including:
a plurality of phase plates each comprising a base section;
a neutral plate comprising a base section; and
a structure configured to maintain the plurality of phase plates and the neutral plate in a rigid orientation;
wherein the base sections of all of the plurality of phase plates are disposed concentrically about the stator in a same plane defined along the orthogonal circumferential and radial directions that is disposed adjacent and parallel to a different plane of the base section of the neutral plate, the different plane offset in the axial direction from the same plane; and
a rotor rotatably couplable to the housing and received within a cavity formed by the stator coil windings.

10. The motor of claim 9, wherein the structure includes a molded thermoplastic structure.

11. The motor of claim 9, wherein the structure includes a mount protrusion configured to support wiring associated with a sensor and the neutral plate includes a tab configured to receive the sensor.

12. The motor of claim 9, wherein each of the plurality of phase plates includes a bolt mount including an internally threaded rod configured to connect to inverter leads.

13. The motor of claim 10, wherein the molded thermoplastic structure includes:

a first molded thermoplastic structure configured to rigidly maintain the plurality of phase plates in a fixed orientation; and
a second molded thermoplastic structure configured to rigidly maintain the neutral plate in a fixed orientation to the first molded thermoplastic structure.

14. The motor of claim 13, wherein a portion of a bottom surface of the first molded thermoplastic structure is chemically bonded to a top surface of the second molded thermoplastic structure.

15. The motor of claim 13, wherein:
the first molded thermoplastic structure includes a plurality of first lock features;
the second molded thermoplastic structure includes the plurality of second lock features; and
the plurality of second lock features being configured to mechanically lock with the plurality of first lock features.

16. A method comprising:
providing a plurality of phase plates each comprising a base section and a neutral plate comprising a base section for a stator windings interface device, wherein the base sections of all of the plurality of phase plates are disposed concentrically about a stator in a same plane defined along a circumferential direction and a radial direction of the stator and that is disposed adjacent and parallel to a different plane of the base section of the neutral plate, the different plane offset in an axial direction of the stator from the same plane;
placing the plurality of phase plates and the neutral plate in a structure configured to maintain the plurality of phase plates and the neutral plate in a rigid orientation; and
attaching the plurality of phase plates and the neutral plate to coil windings of a stator.

17. The method of claim 16, wherein placing includes:
forming the structure around a portion of the plurality of phase plates and a portion of the neutral plate in a mold tooling device.

18. The method of claim 16, wherein placing includes:
forming a first structure around a portion of the plurality of phase plates;
forming a second structure around a portion of the neutral plate; and
attaching the first structure to the second structure.

19. The method of claim 18, wherein attaching the first structure to the second structure includes at least one of chemically bonding or mechanically bonding the first structure to the second structure.

20. The device of claim 1, wherein the base section of each phase plate of the plurality of phase plates defines a height and width within the same plane that are each longer than a thickness defined by the base section of the respective phase plate in the axial direction, and wherein the base section of the neutral plate defines a height and width within the different plane that are each longer than a thickness defined by the base section of the neutral plate in the axial direction.

* * * * *

UNITED STATES PATENT AND TRADEMARK OFFICE
CERTIFICATE OF CORRECTION

| | |
|---|---|
| PATENT NO. | : 11,942,846 B2 |
| APPLICATION NO. | : 17/233702 |
| DATED | : March 26, 2024 |
| INVENTOR(S) | : Dang Dinh Dang et al. |

It is certified that error appears in the above-identified patent and that said Letters Patent is hereby corrected as shown below:

On the Title Page

Under (72) Inventors:
Replace: "Dang Dang, Garden Grove, CA (US);
Logan Balliett, Los Angeles, CA (US)"
With: --Dang Dinh Dang, Garden Grove, CA (US);
Logan Noel Balliett, Los Angeles, CA (US)--.

Signed and Sealed this
Seventh Day of May, 2024

Katherine Kelly Vidal
*Director of the United States Patent and Trademark Office*